Jan. 21, 1964 R. P. BARNES 3,118,264
HAY DISCHARGE CONTROL MEANS FOR HAY CONDITIONING DEVICES
Filed Jan. 3, 1961
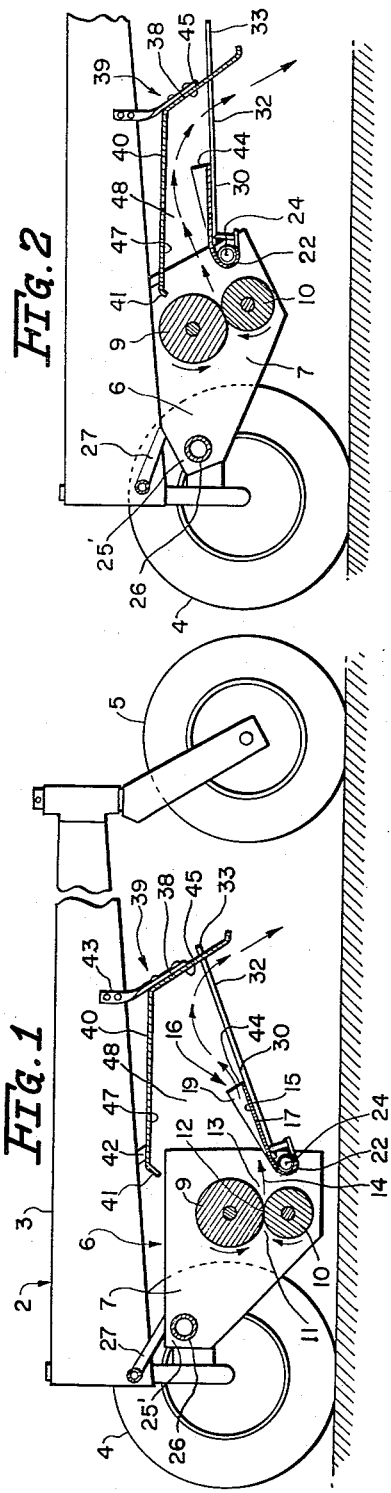
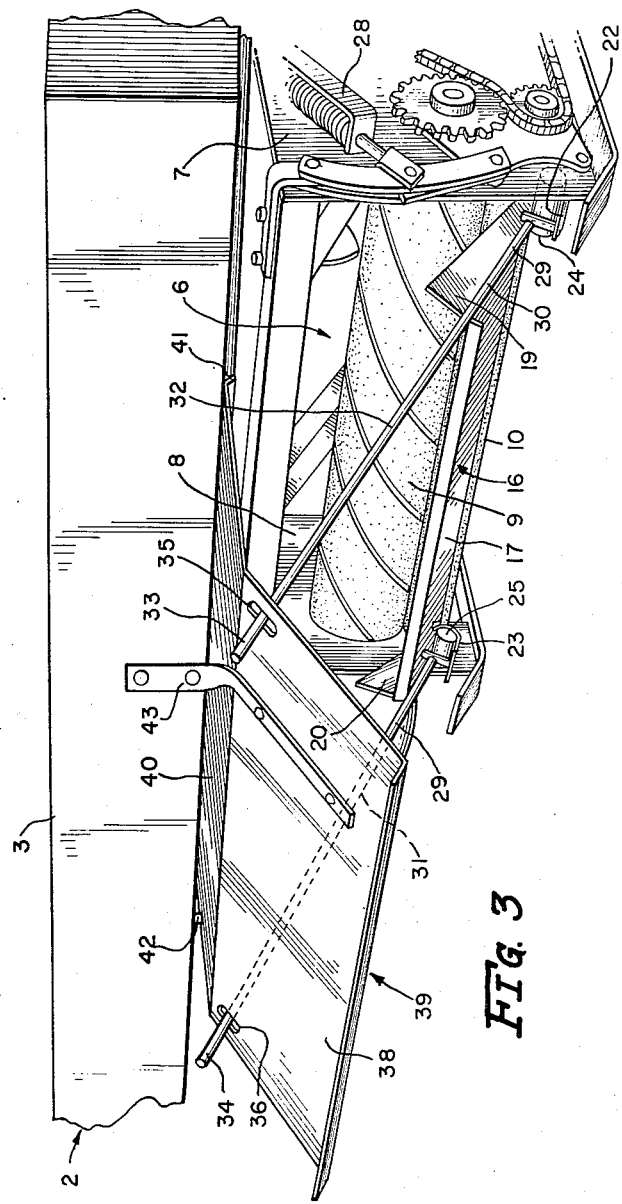
INVENTOR
Ralph P. Barnes
ATTORNEY United States Patent Office  3,118,264
Patented Jan. 21, 1964

3,118,264
HAY DISCHARGE CONTROL MEANS FOR HAY CONDITIONING DEVICES
Ralph P. Barnes, Frederick, Md., assignor to International Harvester Company, Chicago, Ill., a corporation of New Jersey
Filed Jan. 3, 1961, Ser. No. 80,432
8 Claims. (Cl. 56—1)

This invention relates to hay conditioners and more specifically to a mechanism for controlling the discharge of the hay from a hay conditioning device.

Hay conditioners have gained wide popularity in recent years and are now being applied to windrowers wherein the hay is cut and windrowed and then passed through a conditioner which is aligned with the windrow. In such arrangements, it has been found that even when the hay conditioner is elevated to a transport position it frequently is not high enough to clear the windrow and it picks off the hay from the top of the windrow and passes it between the conditioning rollers and discharges the same upwardly and rearwardly. It will be appreciated that in hay conditioners of present construction the rollers are normally arranged either vertically or with the lower roller positioned slightly behind the upper roller so that the material has an upward trajectory. However, to prevent wrapping of material by depositing directly behind the rear roll there is provided a guide or a shield which extends rearwardly from adjacent the rear roll and functions to guide and discharge the material a considerable distance rearwardly of the rear roll.

We have found particularly in such applications of hay conditioners to windrowers having a stationary guide which has a fixed relation with the hay conditioning rolls that upon the conditioner being swung upwardly the guide or deflector is angled upwardly so that it promotes upward discharge of the hay. In such windrowers it has been found that the hay in being forceably ejected upwardly lodges into various drives and transmission and motor components and is a nuisance to clean to prevent fouling of belts, etc. and the clogging of radiators and air filters and the like.

It is a general object of this invention to provide a novel guide which is formed and arranged to maintain a clearing relationship with the hay conditioning rollers and which functions to discharge the hay and guide it away from the rollers in any position of the conditioner and thus obviates the foregoing difficulties.

A more specific object of the invention is to provide a novel guide arrangement which comprises a plate structure pivotally mounted on the hay conditioner on an axis generally parallel to the rolls at an elevation adjacent to the lower roll and wherein the guide is carried by support means which take the form of rods disposed at the lateral edges of the guide plate, said rods extending rearwardly and at their rear end projecting through loose openings in a downwardly and rearwardly inclined deflector shield, the rods functioning to hold the guide in proper relation to the discharging material from the rolls.

These and other objects inherent in and encompassed in the invention will become more apparent from the specifications and the drawings, wherein:

FIGURE 1 is a side elevational view with a rear wheel removed and parts shown in section of a windrower and hay conditioning mechanism incorporating the invention illustrating the parts in normal operating position;

FIGURE 2 is a fragmentary view similar to FIGURE 1 illustrating the conditioner in elevated position; and FIGURE 3 is an enlarged rear perspective view illustrating the apparatus in operating position.

Reference is hereby made to co-pending U.S. application Serial No. 782,809 filed in the name of Sherman C. Heth et al. on December 24, 1958 for Windrower With Crushing Rolls, U.S. Patent 2,989,829 which shows the general organization of the mechanism.

In the present instance it is sufficient to say that the windrower generally designated 2 comprises a frame or support structure 3 which is carried by wheels 4 and 5 at opposite ends of the frame. The hay conditioner generally designated 6 includes side members 7 and 8 which serve as laterally spaced side support structures for upper and lower hay conditioning rolls 9 and 10 which provide a forwardly opened bite 11 into which the hay is adapted to be drawn by the action of the rolls 9 and 10 and conditioned or crushed in the opposed or engaged region of the rolls 9 and 10 and discharged at the axis zone 13 in a trajectory indicated by the arrows 14 against the top side 15 of a rear deflector shield or plate member generally designated 16 which in addition to the flat bottom portion 17 which extends between the panels 7 and 8 comprises a pair of upstanding end walls 19 and 20. The plate 16 is formed adjacent to opposite ends with forwardly projecting hooks 22 and 23 which wrap about stub shafts 24 and 25 extending inwardly from walls 7 and 8 and afford a pivot on a generally horizontal axis substantially parallel to the axis of the rolls 9 and 10 whereby the deflector structure 16 is swingable vertically.

As best seen in FIGURES 1 and 2 the side members 7 and 8 are pivoted at their upper forward corners 25 to a substantially horizontal transverse shaft 26 which provides a pivotal support for the conditioner unit 6 for swinging movement about a horizontal axis pursuant to operation of an actuating mechanism fragmentarily shown at 27 through the operating linkage 28 as best seen in FIGURE 3, the mechanism 27 being part of a system for raising and lowering the windrower.

It will be seen from FIGURES 1, 2 and 3 that the deflector 16 is connected at its lateral edges to the lower ends 29 and 30 of guide rods or links 31 and 32, which in the operating position of the unit as shown in FIGURE 1, extend diagonally upwardly and rearwardly and at their rear ends 33 and 34 project through loose openings 35 and 36 in the downwardly and rearwardly inclined deflector portion 38 of a deflector generally designated 39, the portion 38 emerging at its upper forward edge with the rear extremity of a forwardly generally horizontally extending shield portion 40 of the deflector 39, the shield portion 40 extending to a forward extremity 41 adjacent to the conditioner. The deflector 39 is secured to the frame 3 by means of depending straps 42 and 43.

From a consideration of FIGURES 1 and 2 the action of the lower deflector 16 is readily apparent and it will be observed that in the normal operating position the deflector extends diagonally upwardly and that its top surface 15 is in an intercepting relation with the horizontal plane passing through the crushing area 12 between the rolls and in intercepting relation to the trajectory of the material which is caused to bounce off the top surface 15 and to flow between the rear edge 44 of the guide 16 and the forward or baffle side 45 of the rear deflector portion 38 of the top deflector member 39.

It will be observed from FIGURE 2 that if the plate or deflector 16 were fixed then upon the elevation, the angle of incidence of the surface 15 with respect to the top deflector 39 would change to an extent where it would be directed against the underside 47 of the top portion 48 of the top deflector 39. Under such conditions the area of discharge as represented by the numeral 48 between the plate 17 and the panel 40 would be virtually closed and the material would be directed upwardly. In order to control the flow of this material under those circumstances excessive shielding would have to be provided constituting the plate portion 40 which we have found to be unnecessary. With the present construction, a discharge zone is provided for the normal flow and exit of the material back onto the ground even under the circumstances where the rolls are elevated. The conditioner is positionable in a lowered operating position, various intermediate operating positions and an uppermost transport position. In each position the guide is suitably positioned to discharge the hay upon the ground and not direct it upwardly.

Thus it will be seen that in FIGURE 2 the portion 17 still functions as a guide and will not obstruct the flow of material.

What is claimed is:

1. In a hay conditioning device of the type comprising an ambulatory support, a supported structure pivotally mounted on the support for swinging movement on a generally horizontal axis, hay conditioning means supported on said supported structure and including rollers having a discharge trajectory rearwardly, a guide shield pivotally supported from said supported structure behind the rollers, a deflector structure supported from said supporting structure above the rollers, and linkage supporting said guide shield from said deflector and operative to swing said shield downwardly attendant to said conditioning device being swung upwardly and rearwardly.

2. The combination of an ambulatory supporting structure, a hay conditioning structure suspended from the supporting structure and swingable vertically from a lowered operating position to intermediate positions and an uppermost transport position and having a pair of cooperative rolls providing a forwardly facing bite and a rearwardly discharging exit crotch, a crop guide pivotally supported from the hay conditioning structure behind said rolls and having an edge adjacent said crotch, said guide having a lowered position to guide material discharging from the rolls rearwardly therefrom, and means for positioning said crop guide to deliver rearwardly in all positions of the hay conditioning structure comprising linkage operatively connected between said crop guide and the supporting structure and operative to reposition the guide as said hay conditioning structure is elevated from lowered to the uppermost positions and vice-versa.

3. The combination according to claim 2 and said guide comprising a plate extending lengthwise generally parallel to said rolls and said edge disposed below said crotch adjacent to the lower roll and an upper edge above the trajectory of material exiting from said crotch.

4. In an attachment for a windrower hay conditioner combination wherein said conditioner is suspended from the windrower on a transverse generally horizontal axis and is swingable vertically between lower and upper positions and wherein said conditioner comprises upper and lower cooperative transversely rollers, and transversely spaced apart frame means supporting the same, the improvement comprising: a crop guide behind said lower roll between said frame means pivoted on an axis generally parallel to the rolls, a dependent structure on the windrower, and a rigid control member connected to the guide and projecting rearwardly therefrom through an opening in said structure.

5. The combination of claim 4 wherein said structure comprises a downwardly directed deflector.

6. In a windrower having a mobile frame, a hay conditioner supported thereby for swinging movement about a generally horizontal axis, said conditioner having a rearwardly directed crop exit zone, a crop guide beneath said zone pivoted to said conditioner, and control linkage operatively connected to the guide and to the frame and operative to control the disposition of the guide in response to movements of the conditioner about said axis.

7. In a conditioner having a support structure, rolls mounted on the structure providing a rear exit for crops entered therebetween, and a crop supporting guide movably mounted from the conditioner between said supports beneath said exit and positionable in different positions relative to said exit for controlling deposition of crops therefrom.

8. The invention according to claim 7 and a stationary deflector positioned above said guide and vertically spaced therefrom and providing a crop directing tunnel therewith.

References Cited in the file of this patent

UNITED STATES PATENTS

| | | |
|---|---|---|
| 2,915,869 | Coultas | Dec. 8, 1959 |
| 2,918,774 | McCarty | Dec. 29, 1959 |